United States Patent [19]

Tsunefuji et al.

[11] Patent Number: 4,529,289
[45] Date of Patent: Jul. 16, 1985

[54] CAMERA

[75] Inventors: Katsuhiko Tsunefuji; Masafumi Yamasaki, both of Hachioji, Japan

[73] Assignee: Olympus Optical Company Ltd., Tokyo, Japan

[21] Appl. No.: 500,447

[22] Filed: Jun. 2, 1983

[30] Foreign Application Priority Data

Aug. 21, 1982 [JP] Japan .................. 57-145393
Aug. 21, 1982 [JP] Japan .................. 57-145394
Aug. 21, 1982 [JP] Japan .................. 57-145395

[51] Int. Cl.³ .............................................. G03B 7/093
[52] U.S. Cl. .................................. 354/433; 354/425; 354/472; 354/474
[58] Field of Search ............... 354/433, 434, 410, 412, 354/435, 441, 443, 465, 471, 472, 474, 475

[56] References Cited

U.S. PATENT DOCUMENTS 4,103,307 7/1978 Shinoda et al. ............ 354/23 D
4,453,811 6/1984 Yamasaki .................. 354/412

Primary Examiner—L. T. Hix
Assistant Examiner—David M. Gray
Attorney, Agent, or Firm—Louis Weinstein

[57] ABSTRACT

A camera includes an entry member which commands spotwise photometric means to effect the entry of spotwise brightness value or values of an object being photographed. A spotwise photometric mode is selected in response to a first operation of the entry member, and the entry of a spotwise brightness value or values occurs in response to a second and subsequent operation of the entry member. Spotwise brightness values and a result of an arithmetic operation performed thereon are nullified in response to the completion of a photographing operation in the spotwise photometric mode while maintaining the spotwise photometric mode. Exposure factors used when controlling an exposure by an automatic exposure control means are stored, thereby enabling a photographing operation or operations to be repeated under the same exposure level as that used during a previous photographing operation, by utilizing such exposure factors.

9 Claims, 16 Drawing Figures

CAMERA

BACKGROUND OF THE INVENTION

The present invention relates to a camera, and more particularly, to a camera including spotwise photometric means which facilitates taking a picture through a spotwise photometry.

As is well recognized, a photometry used in the prior art practice of cameras may be categorized into an average photometry and a spotwise photometry. In the average photometry, the brightness level of a relatively broad area of an object being photographed is uniformly determined, and provides a passable result for ordinary objects. Accordingly, almost all conventional cameras having a photometry capability employ this technique. By contrast, the brightness level of a restricted area of an object being photographed is determined in a spotwise manner during the spotwise photometry, and such photometry is effectively utilized when it is desired to control the exposure in accordance with either a bright or dark area of an object being photographed which exhibits a high contrast ratio. However, a disadvantage of the spotwise photometry is that a troublesome operation is required and that there is a likelihood that a picture may be taken with improper exposure. Accordingly, when taking a picture of an ordinary object being photographed, the preference of the average photometry over the spotwise photometry is assumed.

It should be realized however that there are a number of objects being photographed in actuality which exhibit high levels of contrast ratio including an object in the rear light, an object or objects on the stage, an object in a composition formed by viewing the exterior through a window or the like. The chance to take a picture of an object exhibiting a high contrast ratio increases with the improvement in the photographing skill of a user. When an object exhibiting a high contrast ratio is photographed with a camera which employs the average photometry, the exposure is controlled in accordance with an average brightness of the object, and hence it is impossible to reflect the intention of a user in composing the picture if it is desired to control the exposure in accordance with the brightness of either a bright or a dark area of such object.

In the prior art practice, when it is desired to take a picture of such a special object, a so-called spotwise exposure meter having a very limited photometry angle is used to determine the brightness of an object being photographed at a plurality of locations thereon, and exposure factors to be used in taking a picture, such as a diaphragm aperture or an exposure period, are determined on the basis of such brightness information as well as the intended composition describing which part of the object should be taken with a proper exposure and what level should be given to a dark area. Where an object being photographed is accessible as when taking a picture in a studio, the exposure factors are determined as a result of determining the brightness of the object at a plurality of desired locations thereon using an exposure meter of incidence type. It will be appreciated however that the use of an exposure meter which is separate from the camera to perform the spotwise photometry when determining the exposure factors represents both a time and labor consuming procedure and disadvantageously requires complicated calculation.

To accommodate for this, a camera is already available which is provided with spotwise photometric means and which permits the entry of brightness values determined by the spotwise photometric means whenever desired, thus enabling an arithmetic operation to be applied to such values to determine an exposure level. However, conventional cameras of the kind described are constructed so that the entry of brightness values is made by operating an entry member and brightness values entered or a resultant value of arithmetic operation are cancelled by operating a reset member. Hence, if the user forgets to operate the reset member after the completion of a photographing operation with the spotwise photometry, a picture with an improper exposure, which is not intended by the user, may be taken as a result of the previous brightness values being left effective to control the exposure during a succeeding operation. Since a photographing operation with the spotwise photometry represents a rare instance, a camera is also proposed which is arranged to reset the spotwise photometric mode automatically after completing a photographing operation with the spotwise photometry, while simultaneously cancelling brightness values entered. With this camera, an inconvenience is disadvantageously caused in that a select member which enables the spotwise photometric mode must be operated after each completion of a photographing operation if it is desired to take a number of pictures in succession in the spotwise photometric mode.

A camera of the kind described above includes a select member which enables the spotwise photometric mode, and an entry member which is operated to enter spotwise brightness values. The fact that these members are separate results in a troublesome operation and stands in the way to realizing a reduced camera size.

On the other hand, considering a camera of automatic exposure control type, the brightness of an object being photographed, which represents one of the exposure factors, is determined and is used to calculate other exposure factors such as exposure period or diaphragm aperture which are effective to produce a proper exposure for the established brightness of the object. By operating a shutter or a diaphragm in accordance with the exposure factor thus determined, the exposure level is controlled to be constant.

However, in conventional cameras of automatic exposure control type, the photometry and the calculation are repeated for each photographing operation. Consequently, if it is desired to take pictures over a plurality of film frames under the same exposure condition, the exposure factor may vary from operation to operation, resulting in a change in the exposure condition.

To accommodate for this, a camera has been proposed which includes a store member which may be operated to select an exposure level storage mode. When the storage mode is selected, exposure factors are automatically stored for use in a next and a subsequent photographing operation.

However, the camera described immediately above is constructed as a prior cocking type which requires the selection of the exposure level storage mode before initiating a photographing operation, the exposure condition of which should be used as a reference during subsequent photographing operations. Hence, if a user desires, after taking a picture, to take another picture under the same exposure condition as the first one, such cannot be realized.

SUMMARY OF THE INVENTION

In view of the foregoing, it is an object of the invention to provide a camera which is arranged to nullify brightness values entered as a result of the spotwise photometry and a result of arithmetic operation performed thereon automatically in response to the completion of a photographing operation and which maintains a selected photographing mode.

It is another object of the invention to provide a camera including a single member which may be used to select a spotwise photometric mode and to command the entry of a brightness value or values determined by the spotwise photometry.

It is a further object of the invention to provide a camera including means for storing exposure factors which are used during an automatic exposure control, and a store member which commands the same exposure level as that used during a previous photographing operation to be used in a succeeding photographing operation, the store member, when operated, establishing an exposure level storage mode in which a picture is taken under the same exposure level as that used during a photographing operation which immediately precedes the selection of the mode.

In accordance with the invention, brightness values entered as a result of the spotwise photometry and a result of arithmetic operation performed thereon are automatically nullified in connection with the completion of a photographing operation while a selected photographing mode is maintained. This eliminates the need to operate a member which nullifies brightness values entered each time such entry occurs, and also eliminates the likelihood of producing an inadvertent photographing operation as a result of failure to operate such member. In addition, the inconvenience that the mode select member must be operated each time the spotwise photometry is called for is removed.

Where a single member serves the combined functions of selecting the spotwise photometric mode and for commanding the entry of brightness values obtained as a result of the spotwise photometry, the entry of the brightness values may take place at the same time as the spotwise photometric mode is selected. Consequently, there is a likelihood that the entry of brightness values takes place while the user is incapable of monitoring an exposure level which is determined as a result of the spotwise photometry. To accommodate for this possibility, in accordance with the invention, when the member is operated for the first time, only the selection of the spotwise photometric mode is established, and the entry of brightness values is enabled in response to a second and a subsequent operation of the member, thus eliminating the likelihood in a sophisticated manner.

Furthermore, when the invention is applied to a camera in which an exposure level is automatically controlled, means for storing exposure factors which are used during an automatic exposure control, and a store member which selects an exposure level storage mode are provided. When the exposure level storage mode is selected, a picture is taken under the same exposure level as that used during a photographing operation which immediately precedes such selection. In this manner, a "retrofit" choice of the same exposure level is enabled.

BRIEF DESCRPITION OF THE DRAWINGS

DESCRIPTION OF PREFERRED EMBODIMENT

Figure 1:
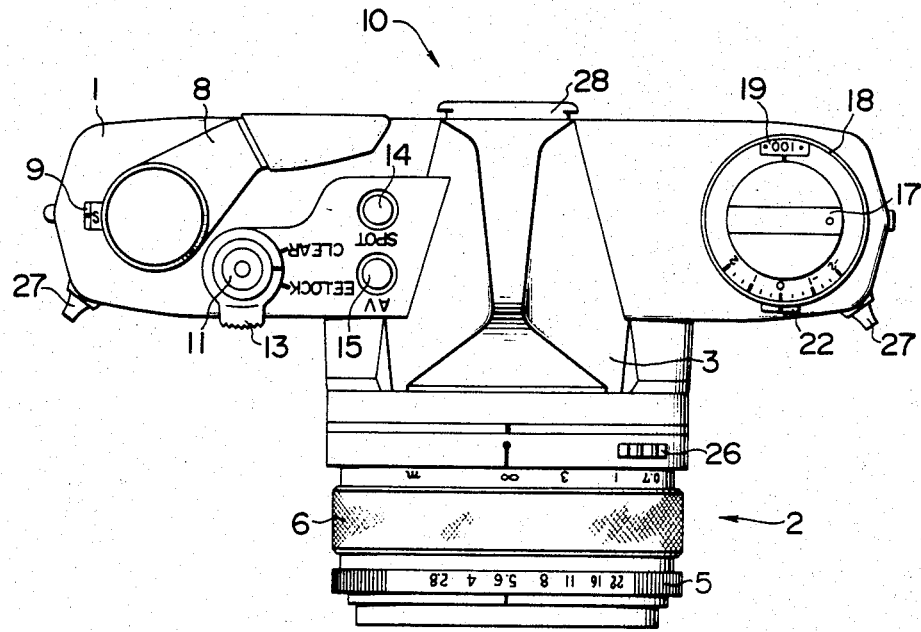
FIG. 1 is a plan view of a camera according to one embodiment of the invention.

Referring to FIG. 1, there is shown a camera according to one embodiment of the invention, in plan view. A camera 10 represents a single lens reflex camera including a body 1. A lens barrel 2 is detachably mounted centrally on the front surface of the body 1, while a pentaprism housing 3 seats centrally on the top surface of the body 1 and projects therefrom in the form of a triangular roof. As is well known, the barrel 2 internally houses and holds a taking lens 4 (see FIG. 2), and rotatably disposed around the barrel 2 are a diaphragm presetting ring 5 and a distance presetting ring 6 in the sequence named, as viewed from the free end of the barrel. A film winding lever 8, a film frame number indicator window 9, a shutter release button 11, an EE lock knob 13, an entry button 14 and an average photometric mode changeover button 15 are disposed on the top surface of the body 1 to the left of the pentaprism housing 3. On the other hand, a film rewind knob 17, a film speed presetting dial 18, a film speed indicator window 19 and an exposure correction knob 22 are disposed on the top surface of the body 1 to the right of the housing 3.

In FIG. 1, numeral 26 represents an operating button which is used when mounting the barrel 2 on the body 1, numeral 27 fixtures which are used to attach a strap, not shown, to the body 1 and numeral 28 a window frame for a finder eyepiece.

The EE lock knob 13 is rotatably mounted on the pedestal of the shutter release button 11, and is normally urged to be brought to and remain stationary at a position where a pointer marked thereon is located intermediate an index "EE.LOCK" and another mark "CLEAR", both inscribed on the top surface of the body 1. The knob 13 may be operated to select an exposure level storage mode (hereafter referred to as "EE lock mode") in which pictures are taken on a plurality of film frames at an exposure level which is once used to take a picture, and to reset the EE lock mode or a spotwise photometric mode. The knob 13 is mechanically interlocked with an EE lock mode selection switch SW3 (see FIG. 4) and a clear switch SW4 (see FIG. 4). The knob 13 may be turned to bring the pointer thereon into alignment with the index "EE.LOCK", thereby closing the EE lock mode selection switch SW3 to establish the EE lock mode. When the knob 13 is turned to bring the pointer into alignment with the index "CLEAR", the clear switch SW4 is closed, and the EE lock mode and the spotwise photometric mode are reset, thus selecting a normal average photometric mode. When the knob 13 is released, it automatically returns to its normal position while maintaining the EE lock mode or the average photometric mode.

The entry button 14 is constructed as a self-resetting pushbutton, and is mechanically interlocked with an entry switch SW2 (see FIG. 4) to be described later. The entry button 14 may be operated for allowing the entry of brightness values of an object being photographed which is determined through the taking lens 4 by the spotwise photometry, into an electrical circuit of the camera 10 for storage. The entry button 14 also serves as a member which may be operated to select the spotwise photometric mode. When the entry button 14 is depressed for the first time under the condition that the average photometric mode is established, the entry switch SW2 is closed to select the spotwise photometric mode. In response to a second and subsequent depression of the entry button 14, a brightness value or values determined by the spotwise photometry are sequentially entered for storage. Thus, if the entry button 14 is depressed n times consecutively, the spotwise photometric mode is established in response to the first depression, and a brightness value is entered in response to a second and subsequent depression, thus storing brightness values which are (n−1) in total number, in the camera 10. It is to be noted that the resetting of the entry button 14 does not terminate the spotwise photometric mode, which can only be terminated by depressing the average photometric mode changeover button 15 or by turning the knob 13 into alignment with the index "CLEAR".

The average photometric mode changeover button 15 is formed by a self-resetting pushbutton, and is mechanically interlocked with an average photometric mode selection switch SW1 (see FIG. 4) to be described later. The changeover button 15 is depressed to effect a switching from the spotwise photometric mode to the average photometric mode.

Figure 2:
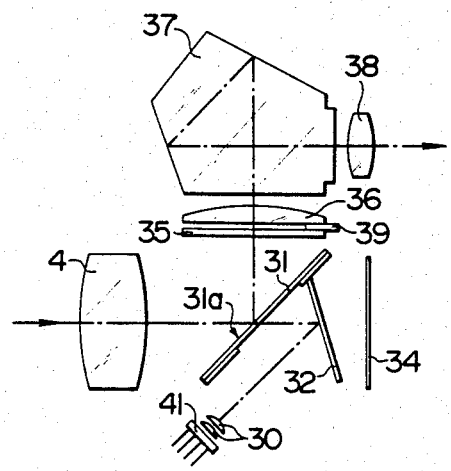
FIG. 2 is a side elevation of a portion of the optics disposed within the camera shown in FIG. 1.

FIG. 2 shows the optics of the camera 10. As is well known, the optics of a single lens reflex camera includes a movable reflecting mirror 31 which is rotatably disposed, but which is normally disposed at an angle of 45° with respect to a taking light path where a finder optical path is defined. In this position, light from an object being photographed which impinges upon the camera 10 through the taking lens 4 is re-directed at right angles upward for incidence upon a finder optics. The finder optics comprises a focussing glass 35 which is located at a position which is optically conjugate to the photosensitive surface of a photographic film 34, a condenser lens 36 disposed immediately above the focussing glass 35, a pentaprism 37 disposed directly above the condenser lens 36, and a finder eyepiece 38 which is located opposite to the rear end face of the pentaprism 37 which represents a light emitting end face thereof. A photographing information display 39 defined by a liquid crystal display panel of light transmission type, to be described later, is interposed between the focussing glass 35 and the condenser lens 36 toward their rear edges.

The central portion of the movable reflecting mirror 31 is processed to provide a half mirror or is formed with an array of fully transmitting slits, thus defining a semi-transmitting area 31a. A total reflecting mirror 32 is mounted in a movable manner on a portion of the back side of the mirror 31 which is aligned with the semi-transmitting area 31a so as to define a given angle with respect to the mirror 31. The total reflecting mirror 32 refelects light from an object being photographed which has passed through the semi-transmitting area 31a of the mirror 31 toward the bottom of the camera 10 where a light receiver 41 is disposed for purpose of photometry. Specifically, such light impinges upon the light receiver 41 through a bank of condenser lenses 30.

Figure 3:
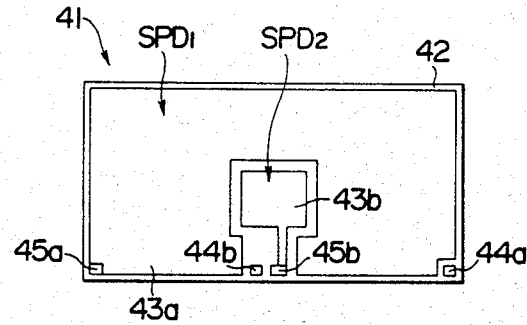
FIG. 3 is a front view of a light receiver which is disposed within the optics shown in FIG. 2 for purpose of photometry.

As shown in FIG. 3, the light receiver 41 is rectangular in configuration, and is disposed at an angle toward the front end of the bottom of the body 1 so as to look up at the total reflecting mirror 32. It comprises a substrate 42 of N-type semiconductor, and P-type semiconductor regions 43a, 43b of an inverted channel configuration and a square configuration, respectively, formed on the surface of the substrate 42. A pair of cathode electrodes 44a, 44b are applied to the substrate 42 while a pair of anode electrodes 45a, 45b are applied to the regions 43a, 43b. The combination of the region 43a and the substrate 42 defines a photoelectric transducer SPD1 (see FIG. 4) which effects an average photometry of light from an object being photographed which is reflected by the mirror 32. The combination of the region 43b and the substrate 42 defines another photoelectric transducer SPD2 (see FIG. 4) which effects a spotwise photometry of light from an object which is reflected by the mirror 32.

Figure 4:
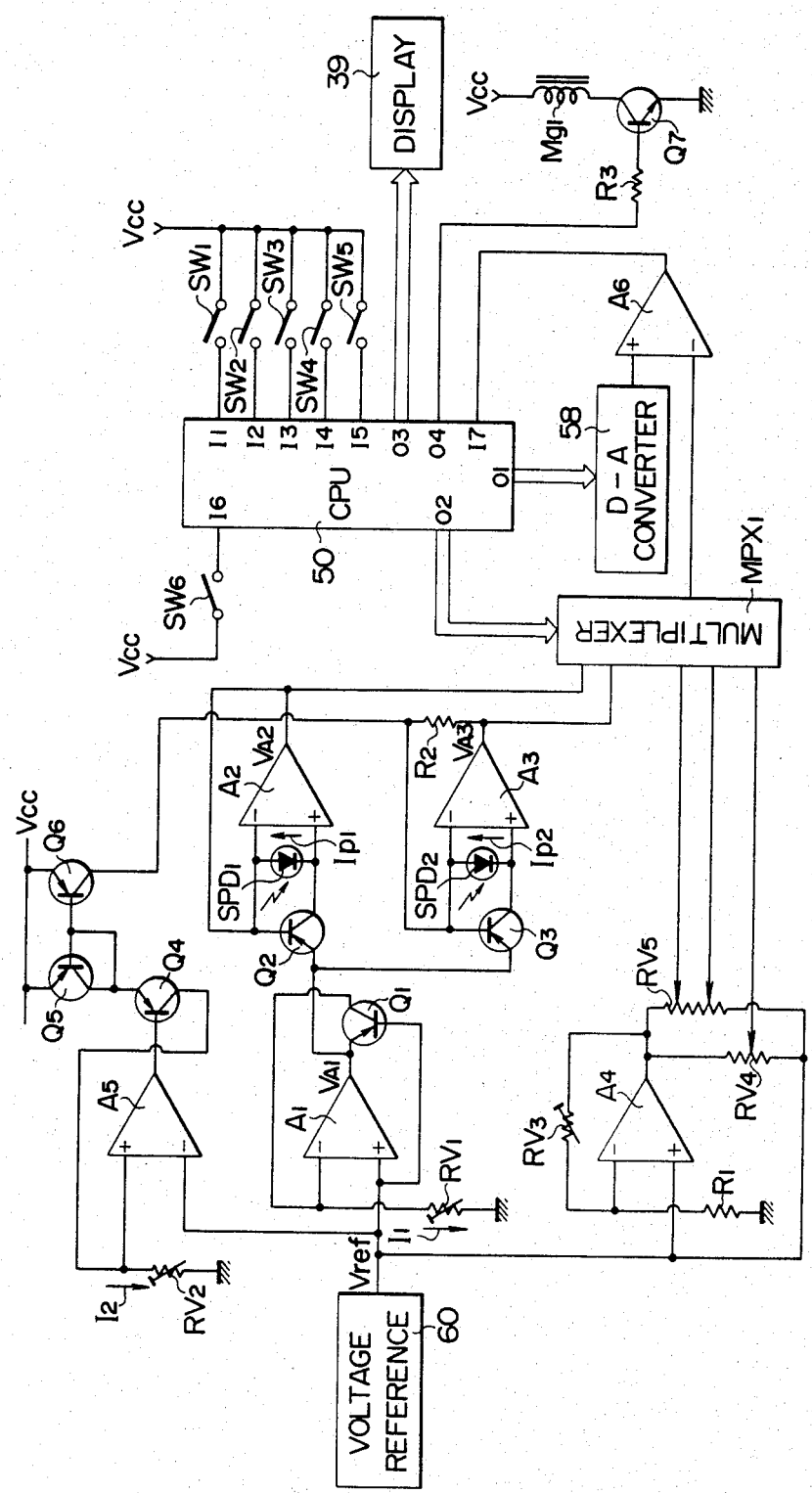
FIG. 4 is a circuit diagram of an electrical circuit used in the camera of FIG. 1.

FIG. 4 shows an electrical circuit used in the camera 10 of the invention. The circuit includes a reference voltage circuit 60, which develops a reference voltage Vref at its output terminal, which is applied to the non-inverting inputs of operational amplifiers A1, A4 and to the inverting input of an operational amplifier A5. The output terminal of the circuit 60 is also connected to one end of a variable resistor RV4 which is used to choose a voltage corresponding to a diaphragm value, and of another variable resistor RV5, which is used to choose a voltage corresponding to a film speed and a correction value. The amplifier A1 has its inverting input connected to the ground through a semi-fixed resistor RV1 which is used to adjust the brightness level. The output of the amplifier A1 is connected to the emitter of a transistor Q1 and to the emitters of transistors Q2, Q3. The transistor Q1 operates to produce a logarithmically compressed voltage, and the transistors Q2 and Q3 operate to provide a logarithmic compression of photocurrent. As shown, the transistor Q1 is of PNP type, and has its base connected to the non-inverting input and its collector connected to the inverting input of the amplifier A1. A current $I_1$ flows through the semi-fixed resistor RV1 and through the emitter-collector path of the transistor Q1 which makes the potential at the inverting input of the amplifier A1 equal to the reference voltage Vref. Thus, $$I_1 = Vref/RV1 \tag{1}$$

Accordingly, a voltage $V_{A1}$ is developed at the output of the amplifier A1 which is defined as follows:

$$V_{A1} = Vref + \frac{kT}{q} \ln \frac{I_1}{I_S} \tag{2}$$

where k represents Boltzmann's constant, T absolute temperature, q unit of charge, and $I_S$ the inverse saturation current.

The transistors Q2 and Q3 which are used to provide a logarithmic compression of photocurrent are of PNP type, and the photoelectric transducer SPD1 which effects the average photometry is forwardly connected between the base and collector of the transistor Q2 while the photoelectric transducer SPD2 which effects the spotwise photometry is forwardly connected between the base and collector of the transistor Q3. The anode of the transducer SPD1 is connected to the inverting input of the amplifier A2 while its cathode is connected to the non-inverting input thereof. The anode of the transducer SPD2 is connected to the inverting input while the cathode thereof is connected to the non-inverting input of the amplifier A3. The output of the amplifier A2 is connected to the inverting input thereof and is also connected to a first input of a multiplexer MPX1 which comprises a plurality of analog switches. The output of the amplifier A3 is connected through a resistor R2 to the inverting input thereof and to the collector of a transistor Q6, to be described later, and also is connected to a second input of the multiplexer MPX1.

The amplifier A5, which has reference voltage Vref applied to its inverting input, has its non-inverting input connected to the ground through a semi-fixed resistor RV2 which is utilized to adjust the brightness level during the spotwise photometry. The output of the amplifier A5 is connected to the base of a PNP transistor Q4, the collector of which is connected to the non-inverting input of the amplifier A5 and the emitter of which is connected to the collector and base of a PNP transistor Q5. An operating voltage Vcc is applied to the emitter of the transistor Q5, the base of which is connected to the base of a PNP transistor Q6. The operating voltage Vcc is also applied to the emitter of the transistor Q6, which forms a current mirror circuit together with the transistor Q5. The collector of the transistor Q6 is connected to one end of the resistor R2 as mentioned above. A current $I_2$ flows through the semi-fixed resistor RV2 and through the emitter-collector path of the transistor Q5, as defined by the following equation:

$$I_2 = Vref/RV2 \tag{3}$$

which current is effective to make the voltage at the non-inverting input to be equal to the voltage Vref applied to the inverting input of the amplifier A5. It will be seen that the current $I_2$ also flows through the transistors Q5 and Q6.

Assuming that a photocurrent $I_{p1}$ passes through transducer SPD1 and the transistor Q2, the voltage $V_{A2}$ at the output of the amplifier A2 is given as follows:

$$V_{A2} = V_{A1} - \frac{kT}{q} \ln \frac{I_{p1}}{I_S} \tag{4}$$

The substitution of the equation (2) yields:

$$V_{A2} = Vref + \frac{kT}{q} \ln \frac{I_1}{I_S} - \frac{kT}{q} \ln \frac{I_{p1}}{I_S} \tag{5}$$

$$= Vref + \frac{KT}{q} \ln \frac{I_1}{I_{p1}}$$

Assuming that a photocurrent $I_{p2}$ flows through the transducer SPD2 and the transistor Q3, the voltage $V_{A3}$ developed at the output of the amplifier A3 is given as follows:

$$V_{A3} = V_{A1} - \frac{kT}{q} \ln \frac{I_{p2}}{I_S} + (I_{p2} + I_2)R2 \tag{6}$$

Substituting the equation (2) and rearranging, we have $$V_{A3} = Vref + \frac{kT}{q} \ln \frac{I_1}{I_{p2}} + (I_{p2} + I_2)R2 \tag{7}$$

It will be seen that since the output voltages $V_{A2}$, $V_{A3}$ from the amplifiers A2, A3 do not contain the inverse saturation current $I_S$, in the photometric circuit used in the camera of the present embodiment, any influence of the inversed saturation current $I_S$ is eliminated. An adjustment of the semi-fixed resistor RV1 causes a change in the magnitude of the current $I_1$, thus allowing the output voltages $V_{A2}$, $V_{A3}$ or the average and the spotwise photometry output to be adjusted. Also, an adjustment of the semi-fixed resistor RV2 causes a change in the magnitude of the current $I_2$, allowing the output voltage $V_{A3}$, namely, the output for the spotwise photometry to be adjusted alone.

As shown, the amplifier A4, which has its noninverting input connected to be supplied with the reference voltage Vref, has its inverting input connected to the ground through a resistor R1. A semi-fixed resistor RV3 is connected between the inverting input and the output of the amplifier A4 for developing a voltage which depends on the number of steps assumed by the variable resistors RV4, RV5. These variable resistors RV4, RV5 are connected in parallel between the output of the amplifier A4 and the output terminal of the reference voltage circuit 60. It is to be noted that a sliding tap on the variable resistor RV4 is mechanically interlocked with a diaphragm, not shown, and is connected to a fifth input of the multiplexer MPX1, thus supplying a voltage corresponding to a diaphragm value AV thereto. The variable resistor RV5 has a first sliding tap which is mechanically interlocked with the film speed presetting dial 18 (see FIG. 1) and which is connected to a third input of the multiplexer MPX1, thus supplying a voltage corresponding to a value of film speed SV thereto. The variable resistor RV5 has a second sliding tap which is mechanically interlocked with the correction knob 22 (see FIG. 1), and is connected to a fourth input of the multiplexer MPX1, thus supplying a voltage corresponding to a correction value CV thereto.

As mentioned previously, the multiplexer MPX1 comprises a plurality of analog switches. Its first input receives the output voltage $V_{A2}$ from the amplifier A2 which corresponds to the brightness value BV1 determined by the average photometry. Its second input receives the output voltage $V_{A3}$ from the amplifier A3 which corresponds to the brightness value BV2 determined by the spotwise photometry. Its third input receives the voltage on the first tap on the variable resistor RV5 which corresponds to a value of film speed SV. Its fourth input receives a voltage on the second tap on the variable resistor RV5 which corresponds to a correction value CV. Its fifth input receives a voltage on the sliding tap on the variable resistor RV4 which corresponds to a diaphragm value AV. The multiplexer MPX1 functions to pass one of above five inputs selectively. In order to select one of these inputs, it has a control signal input which is connected to an output port O2 of a central processing unit (CPU) 50, which is formed by a microcomputer. The output of the multiplexer MPX1 is connected to the inverting input of a comparator A6 which forms an A/D conversion circuit of sequential conversion type together with a D/A converter 58. The converter 58 has its input connected to an output port O1 of CPU50, and its output is connected to the non-inverting input of the comparator A6. The output of the comparator A6 is connected to an input port I7 of CPU50.

CPU50 has an output port O4 which is connected to the base of a switching transistor Q7 through a resistor R3. The transistor Q7 is of NPN type and has its emitter connected to the ground and its collector connected through the coil of an electromagnet Mg1 to the operating voltage Vcc. Thus, the conduction of the transistor controls the energization of the electromagnet. CPU50 also has an output port O3 which is connected to the input of the photographing information display 39, which comprises a liquid crystal display panel.

CPU50 also has input ports I1 to I6, all of which internally contains a pull-down resistor, not shown. It will be seen that each of the input ports I1 to I6 is connected to one end of an average photometric mode selection switch SW1, the entry switch SW2, an EE lock mode selection switch SW3, a clear switch SW4, a release switch SW5 and a trigger switch SW6, respectively. All of these switches SW1 to SW6 are normally open, and the other end of each of them is connected to receive the operating voltage Vcc. The average photometric mode selection switch SW1 is closed in response to the depression of the average photometric mode changeover switch 15 (see FIG. 1), thereby selecting the average photometric mode. The entry switch SW2 is closed in response to the depression of the entry button 14 (see FIG. 1), thus selecting the spotwise photometric mode and allowing the entry of brightness values. The EE lock mode selection switch SW3 is closed in response to the movement of the knob 13 (see FIG. 1) into alignment with the index "EE.LOCK", thus selecting the EE lock mode. The clear switch SW4 is closed in response to the movement of the knob 13 (see FIG. 1) into alignment with the index "CLEAR", thus clearing brightness values entered during the spotwise photometric mode and a result of arithmetic operation performed thereon, and resetting the spotwise photometric mode and the EE lock mode. The release switch SW5 is closed in response to the depression of the shutter release button 11 (see FIG. 1) and is opened in response to the completion of an exposure process. The trigger switch SW6 is closed in response to the upward movement of the movable reflecting mirror 31 and is opened in response to the downward movement thereof, thus detecting the initiation of an exposure process.

Figure 5:
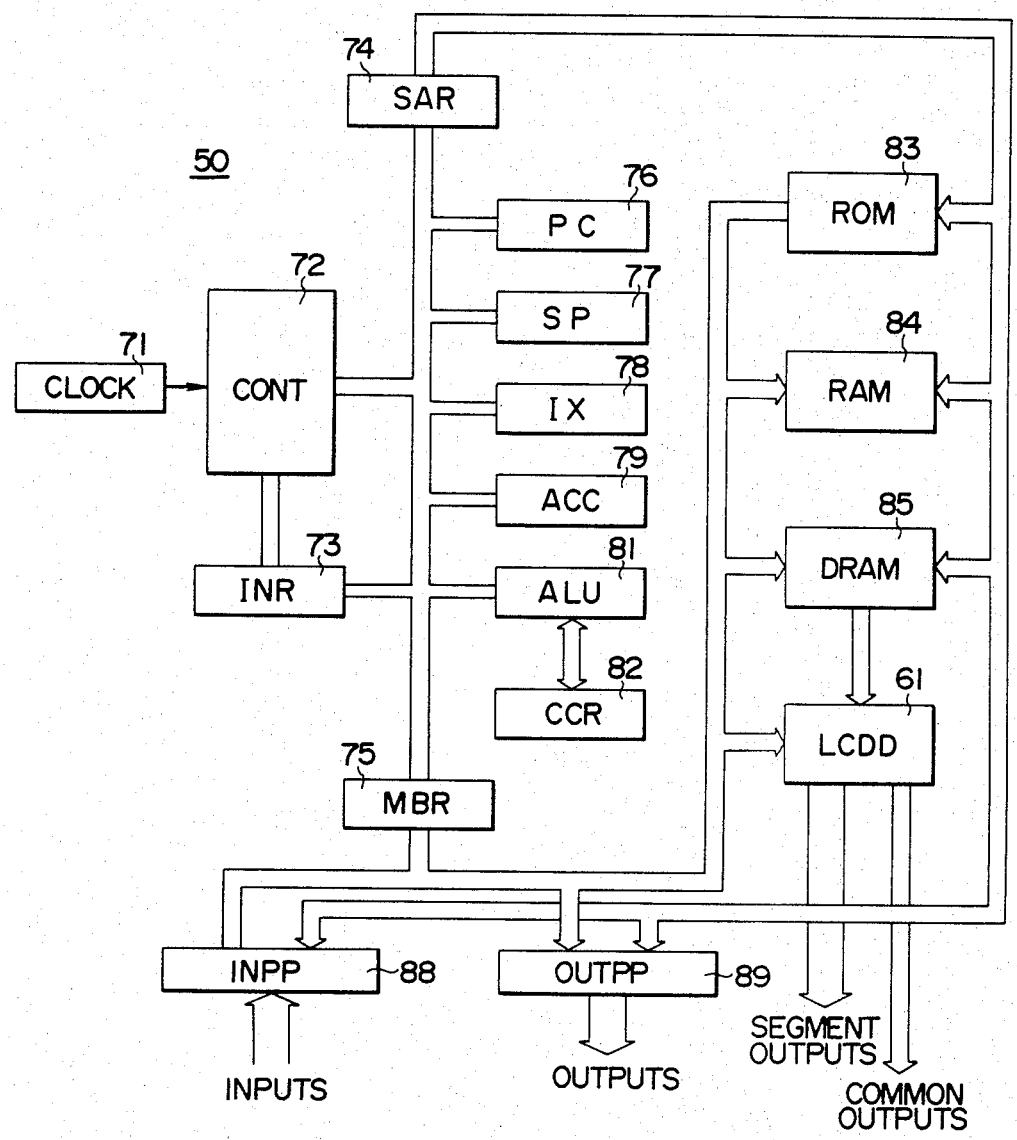
FIG. 5 is a block diagram of a central processing unit shown in FIG. 4, illustrating the internal arrangement of a microcomputer which is used as such unit.

FIG. 5 is a block diagram showing the internal arrangement of CPU50 which constitutes the heart of a control system used in the camera 10 of the invention. As shown, a clock generator (CLOCK) 71 produces a pulse, to which the operation of CPU50 is referenced. A control circuit (CONT) 72 controls the entire operation of CPU50. It is necessary that CPU50 transfers and processes a variety of binary data in proper sequence according to a predetermined sequence of programs. To this end, CPU50 must have some internal provision to determine which gates therein should be enabled and what duration they should be enabled and which flip-flops should be set or reset, in accordance with the status and input conditions relating to CPU50. This task is performed by CONT72. An instruction register (INR) 73 temporarily stores the content of a random access memory (RAM) 84, to be described later, and CONT72 determines the status of various parts of CPU50 in accordance with the content of INR73. A program counter (PC) 76 stores the addresses of instructions to be executed in order to assure the execution of the programs in a proper sequence. Specifically, these addresses increment by one from the lowest to the highest memory address in the order of execution. A stack pointer (SP) 77 temporarily stores the content of PC76, an accumulator (ACC) 79 and an index register (IX) 78 or the like without destroying it, in the event an interrupt instruction or a jump instruction to a subroutine occurs, for allowing such content to be re-used after returning from such instruction. IX78 stores the address of an instruction to be executed when an instruction is to be executed in an index address form. An arithmetic and logical unit (ALU) 81 performs a portion of the execution of an instruction which relates to an arithmetic and a logical operation. Thus it performs an addition or a subtraction or executes an invert instruction which causes the content (either "1" or "0") of a memory to be inverted, or forms a logical sum or a logical product of two data. A condition code register (CCR) 82 stores a code which is used in the detection of a status as a flag when executing an instruction such as a branch instruction which requires a determination. The determining function plays an important role in CPU50, and when controlling the camera 10 of the invention, the execution of a branch instruction is frequently required, which determines the status (either "1" or "0") of each input port to change the flow of a program to be executed next or to execute the next instruction in the sequence without changing the flow. Such execution is performed by determining the condition of a flag or flags in CCR82. Specifically, CCR82 contains a variety of flags including a negative flag which will be set to "1" if a result of executing an instruction is negative in 2's complement form and which will be set to "0" if the result is positive; a zero flag which will be set to "1" if the result is "0" and set to "0" otherwise; an overflow flag which will be set to "1" when the result produces an overflow in 2's complement form and which will be set to "0" otherwise; a carry flag which will be set to "1" if a result of the arithmetic operation produces a carry or a borrow from a binary number without sign and which will be set to "0" otherwise; etc. A memory buffer register (MBR) 75 represents a register into which the content at a specified memory address is read in response to a command to read out a memory when an address where a read-out should be made is supplied to a storage address register (SAR) 74.

A read only memory (ROM) 83 is sequentially read out by CPU50 to enable the execution of successive instructions. A random access memory (RAM) 84 functions to provide a temporary storage of values produced in the course of an arithmetic operation or a result thereof as well as a variety of input information. A display random access memory (DRAM) 85 includes a plurality of areas which have one-to-one correspondence to individual segments of the liquid crystal display panel which forms the photographing information display 39 (see FIG. 4). If the content at a specified address of DRAM85 is "1", the corresponding segment of the display panel is energized or illuminated. A liquid crystal driver circuit (LCDD) 61 drives the photographing information display 39 formed by the liquid crystal display panel, and includes a plurality of segment lines and common lines. An input port assembly (INPP) 88 includes the seven input ports I1 to I7 mentioned above while an output port assembly (OUTPP) 89 includes the four output ports O1 to O4 mentioned above (see FIG. 4). It is to be noted that each output from OUTPP89 represents a latched output.

Briefly summarizing the control action by CPU50, it is to be understood that CPU50 repeats a pair of cycles, namely, a fetch cycle which causes an instruction stored at an address within a memory which is specified by PC76 to be loaded, and an execute cycle in which that instruction is executed. Initially, a count in PC76 is transferred to SAR74. Simultaneously, PC76 then stores the previous content thereof added with one. A read command is issued to the memory after the address is transferred to SAR74. The content at the specified address is read into MBR75 after a short time delay. The instruction code portion of the content is then transferred to INR73. This represents the fetch cycle. Then follows the execute cycle, the detail of which depends on the content stored in INR73. By way of example, assume that an instruction to load the content of the memory into ACC79 (LDA instruction) is transferred to INR73. The address portion of the instruction which remains in MBR75 is transferred to SAR74, followed by a read command issued to the memory. After a short time delay, MBR75 acquires data, which is transferred to ACC79, thus terminating the execution of the instruction.

By way of another example, the execution of a conditional branch instruction, which frequently occurs in flow charts to be described later, will be described. Assuming that the conditional branch is based on the determination of the status of a port, say port A, the content of the port A is read into MBR75 during the fetch cycle, in the manner mentioned above. It is assumed that the bit at the port A corresponds to the most significant bit in the memory. Assuming that an LDA instruction to load the content of the memory into ACC79 is supplied to INR73, the content of the port A is transferred to ACC79, in the same manner as mentioned above. Then PC76 indicates the address of an instruction to be executed next. This instruction is stored in MBR75 in the similar manner. Assuming that INR73 contains an instruction (ROL instruction) to shift the most significant bit of ACC79 to the carry flag of CCR82, the status, either "0" or "1", of the port A will be stored in the carry flag during the next execute cycle. Then an instruction (BCS instruction) to make a branch if the carry flag is "1" and to execute a next instruction in the program otherwise is executed by determining the status of the carry flag. In this manner, the intended purpose is served. In this example, three instructions including LDA, ROL and BCS have been used in combination. In this manner, by utilizing an arbitrary combination of as many as several tens of instructions, any desired control can be achieved.

Flow charts shown in FIGS. 11 to 16 and to be described later do not indicate the specific use of various blocks shown in FIG. 5 to execute each of the programs in machine language, but it should be understood that instructions for transfer, addition, subtraction and the like which appear in the programs can be simply implemented in known manner.

FIGS. 6 to 10 illustrate several manners of display provided by the photographing information display 39. As mentioned previously, the display 39 is formed by a liquid crystal display panel which is known in itself, and comprises a plurality of electrodes representing exposure periods from "1" to "2000", a linear array of horizontally elongate segment electrodes which are disposed directly above the exposure period electrodes for displaying a bar, a linear horizontal array of diamond-shaped segment electrodes disposed directly above the segment electrodes and which display a point or points, and "SPOT" and "MEMO" electrodes. Each electrode is transparent, whereby the display 39 is of light transmission type. The segment electrodes which display a bar are used to indicate an exposure period corresponding to the average brightness during the average photometric mode or corresponding to an arithmetic mean of brightness values during the spotwise photometric mode. The segment electrodes which display a point or points are used to indicate an exposure period which corresponds to each the brightness values during the spotwise photometric mode. "SPOT" electrode indicates that the spotwise photometric mode has been selected while "MEMO" electrode indicates that the EE lock mode has been selected.

As mentioned previously, each electrode has an associated area in DRAM85 (see FIG. 5) in one-to-one correspondence. Voltages are selectively applied to the electrodes in accordance with the content of these areas, thus displaying a shutter speed index, a bar representing an exposure period TV or a point representing an exposure period. It should be understood that the display produced by the display 39 represents a latched display, and hence once a segment is displayed, the display of that segment cannot be cleared unless the content of the corresponding area is changed.

It is to be noted that in the flow charts shown in FIGS. 11 to 16, a clearing operation for an area or areas which takes place before an updated display is produced is not specifically indicated, but that such clearing operation takes place in a program which effects a basic display, a bar display or a point display. The content of an area is updated at a high speed corresponding to several tens of microseconds, and hence no flickering occurs if segments which need not be changed are momentarily cleared.

Before describing the operation of the camera 10, several photographing modes used in the camera 10 will be generally described. The camera 10 can be operated in either average photometric mode or spotwise photometric mode. In the average photometric mode, a photographing operation is controlled on the basis of an average brightness value which is obtained by the photometry of an object being photographed over a relatively broad area. The spotwise photometric mode is selected by the depression of the entry button 14 under the condition that the average photometric mode is established. The first depression of the entry button 14 only changes the photographing mode, without accompanying the entry of any brightness value. During a second and subsequent depression of the entry button 14, successive brightness values are entered, and when the shutter is released, a photographing operation takes place at an exposure level which is determined on the basis of an arithmetic mean of brightness values. In either average or spotwise photometric mode, the EE lock mode can be selected. The EE lock mode is selected by turning the EE lock knob 13 (see FIG. 1) into alignment with the index "EE.LOCK" to thereby close the EE lock switch SW3 (see FIG. 4), after turning on the camera 10 and after performing at least one photographing operation. During subsequent photographing operations, pictures can be taken as many times as desired under the same exposure level as that used during the photographing operation which took place before the EE lock switch SW3 is closed.

The operation of the camera 10 will now be described with reference to flow charts shown in FIGS. 11 to 16. In construing these flow charts, it should be noted that MX (X being an arbitrary number) represents a memory address, (MX) the content of a memory at an address MX, and "←" a transfer operation. Thus, for example, "MA1←0" means the storage of "0" in a memory at an address MA1. Also, "MA1←(MA3)" means the transfer of the content of a memory at an address MA3 into a memory at an address MA1.

Figures 14, 15, 16:
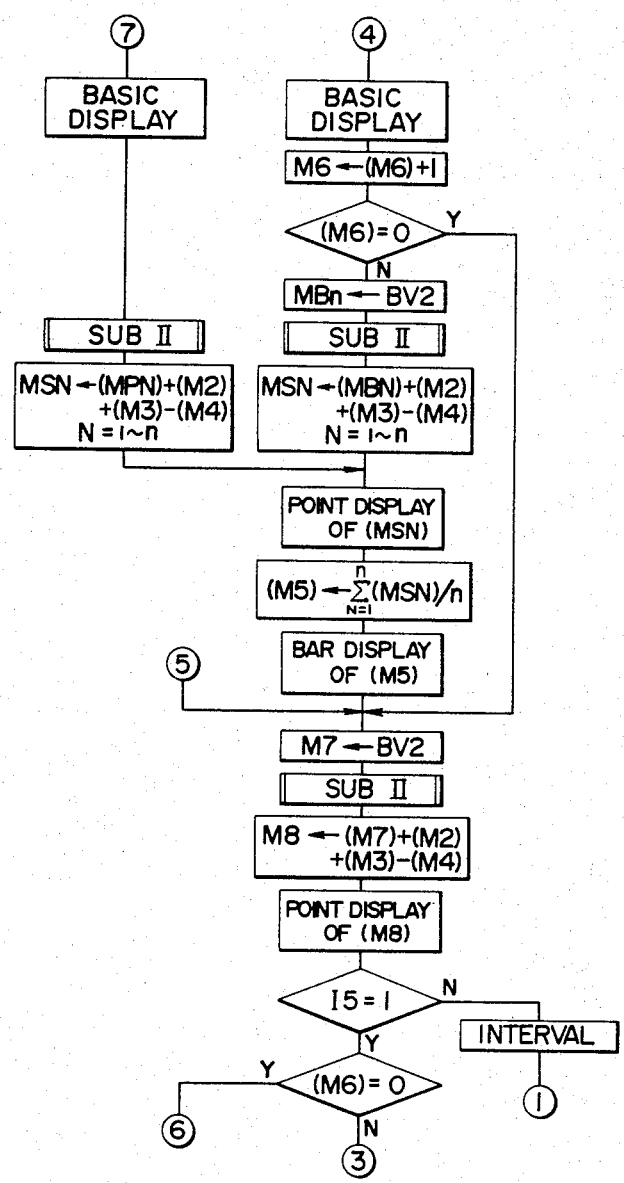

Initially, when the camera 10 is turned on, the operating voltage is supplied to the electrical circuit shown in FIG. 4. In CPU50, the program starts from a mode determining flow chart shown in FIG. 11. Initially, in a subroutine SUB I, various flags and memories are initialized. As shown in FIG. 15, "0" is stored in a flag MA1 in order to initialize a spotwise mode detecting flag MA1. "0" is stored in a similar flag MA2 in order to initialize a spotwise entry detecting flag MA2. Then "−1" is stored in a memory M6 in order to initialize a number of entries in memory M6. "0" is stored in a flag ME1 in order to initialize an EE lock detecting flag ME1. Returning to the mode determining flow chart shown in FIG. 11, "0" is stored in an EE lock enable flag ME2 in order to initialize it. The purpose of the flag ME2 is to prevent the selection of the EE lock mode unless at least one photographing operation has taken place after the camera 10 is turned on.

It is then determined if the EE lock knob 13 is turned into alignment with the index "CLEAR" by a decision block to see if I4=1. If the knob is turned in this manner and the clear switch SW4 is turned on, I4=1. Hence, the program makes an exit from this decision block through YES (which is indicated by Y on the flow chart), branching into the subroutine SUB I where various flags and memory are cleared, followed by the decision of the EE lock enable flag ME2. On the other hand, if the knob 13 is not turned and the clear switch SW4 remains off, I4=0, and hence an exit is made from the decision block of I4=1 through NO (which is indicated by N on the flow chart), immediately beginning the decision of the flag ME2.

In this block, a decision is made to see if (ME2)=0. If (ME2)=0, there has taken place no photographing operation since the camera has been turned on, and hence an exit is made through YES from this block, jumping over the next following detection of the EE lock mode (a decision to see if I3=1), entering the determination of the average photometric mode (I1=1).

(1) Assuming that no actuating member has been operated since the camera 10 has been turned on, it will be seen that the average photometric mode is established in the camera 10. Thus, the switch SW1 is off as is the entry switch SW2, and hence an exit is made through NO from the decision blocks to see if I1=1 and I2=1. "0" is then stored in the entry detecting flag MA2 to initialize it, followed by a decision block to see if (MA1)=1, from which an exit is made through NO. Thereafter, the program branches to a flow chart for the average photometric mode shown in FIG. 12 through ②−②.

Figure 6:
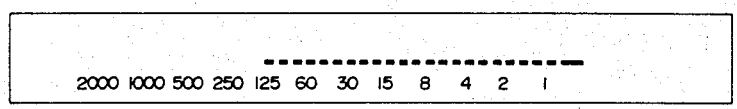
FIGS. 6 to 10 are enlarged front views of a photographing information display shown in FIGS. 2 and 4.
Figure 12:
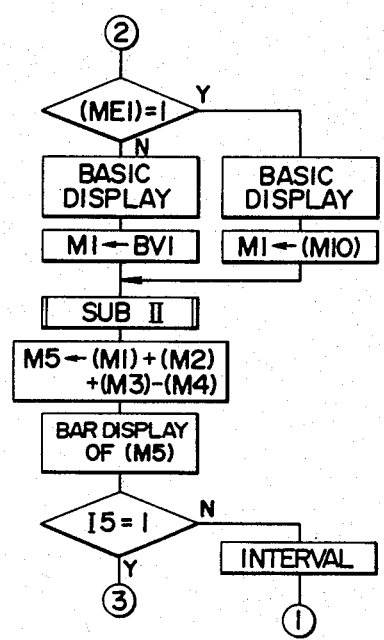

In FIG. 12, a decision is initially made to see if (ME1)=1, thus determining if the EE lock mode is established. Since the EE lock mode is not established now, an exit is made through NO from this decision, followed by a basic display by the display 39. As shown in FIG. 6, the basic display represents the display of exposure period or shutter speed indices from "1" to "2000". An average brightness value BV1 is then stored in a brightness memory M1. This entry takes place by controlling the multiplexer MPX1 to derive a voltage corresponding to the average brightness value BV1 at the output thereof and passing it through the A/D conversion circuit of sequential comparison type, comprising the comparator A6, to be fed to the input port I7 in digital form.

After the entry of the average brightness value BV1, the program branches to a subroutine SUB II shown in FIG. 16 where film speed value SV, correction value CV and diaphragm value AV are entered in a manner similar to that used for entering the average brightness value BV1, thus storing them in a film speed memory M2, a correction value memory M3 and a diaphragm value memory M4, respectively. The program then returns to the flow chart for the average photometric mode shown in FIG. 12 An Apex exposure period value TV is calculated according to the formula {(M1)+(M2)+(M3)−(M4)}, with a result being stored in an exposure period storage area M5. The exposure period value TV (M5) is then displayed in a bar form by the display 39 (see FIG. 6).

A decision then follows to see if I5=1, thus determining if a shutter release has taken place. If not, an exit is made through NO from this decision block, followed by the execution of an interval instruction and thereafter returning to the mode determining flow chart shown in FIG. 11 through ①−①. Thus, unless the shutter release button 11 is depressed or other member is operated, the program loops around the path mentioned above. The purpose of the interval instruction is to make a time adjustment so that one cycle through the program has an execution time of about 100 mS, such adjustment being simply achieved with a microcomputer processing.

Figure 13:
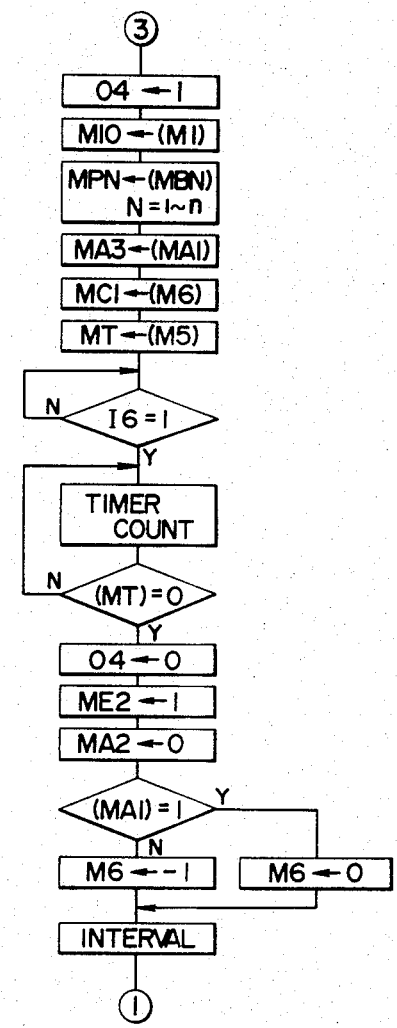

If the shutter release button is depressed to close the release switch SW5, an exit is made through YES from the decision block of I5=1 in FIG. 12, thus branching to a flow chart for the shutter release shown in FIG. 13 through ③−③. In this flow chart, "1" is initially stored in the output port O4. In the electrical circuit shown in FIG. 4, the transistor Q7 is then turned on to energize the coil of the electromagnet Mg1, thus constraining the second blind of the shutter. The content of the brightness value memory M1, or (M1), is then stored in a brightness value save memory M10, thus saving the average brightness value BV1. This accommodates for the possibility that the next photographing operation may be effected in the EE lock mode, which requires that the average brightness value BV1 of the present photographing operation to be saved. Then the spotwise brightness values which have already been entered, the spotwise mode detecting flag MA1 and the number of entries are sequentially saved as indicated by (MPN←(MBN), N=1 to n), (MA3←(MA1)) and (MC1←(M6)). It will be seen that this has significance only if the next photographing operation takes place in the spotwise photometric mode, and is of no consequence in the present instance in which the average photometric mode is employed. The exposure period value TV (M5) which is determined by the Apex calculation is then stored in a timer count preset memory MT. A decision is then made to see if I6=1, thus determining if the trigger switch SW6 has been closed to initiate an exposure process. If the exposure process is initiated, an exit is made through YES from this decision block, entering a timer counting program in which the count is sequentially counted down from the initial preset value (MT) until the memory content (MT) becomes equal to "0", whereupon an exit is made through YES from this program, followed by storing "0" at the output port O4. Then, in the electrical circuit of FIG. 4, the transistor Q7 is turned off to deenergize the coil of the electromagnet Mg1, thus allowing the second blind of the shutter to begin running. In this manner, the exposure process is terminated. Subsequently, "1" is stored in the EE lock enable flag ME2, indicating that at least one photographing operation has taken place since the camera has been turned on, thus enabling the selection of the EE lock mode. Subsequently, "0" is stored in the spotwise entry detecting flag MA2, thus resetting it to a condition which represents no entry of spotwise data. It will be seen that this has significance only when a next photographing operation is to take place in the spotwise photometric mode, and has no significance in the present instance which employs the average photometric mode. A decision is then made to see if (MA1)=1, thus determining if the present photographing operation has been made in either the average or the spotwise photometric mode. Since it has taken place in the average photometric mode, an exit is made through NO from this decision block, followed by the initialization of the number of entries in memory M6 by storing "−1" therein. If the photographing operation has taken place in the spotwise photometric mode, it follows that (MA1)=1, and hence an exit is made through YES, followed by storing "0" in the memory M6 so that the entry of a spotwise brightness value may take place immediately upon the next depression of the entry button 14. The execution of an interval instruction follows. Such interval is required to provide a time delay on the order of several tens of milliseconds after the completion of the exposure process until the movable reflecting mirror 31 completes its downward movement to allow the next photometry to be initiated in actuality. The program then returns to the mode determining flow chart shown in FIG. 11 through ①—①, thus looping around the path described above.

It is to be noted that the depression of the average photometric mode changeover button 15 when the spotwise photometric mode is established also establishes the average photometric mode in the camera 10. In this instance, in the mode determining flow chart of FIG. 11, as the selection switch SW1 is turned on, it follows that I1=1. Hence, an exit is made through YES from the decision block to see if I1=1, followed by the initialization of the spotwise mode detecting flag MA1 and the entry detecting flag MA2 by storing "0" in each of them. Subsequently, an exit is made through ②—②, thus branching to the flow chart for the average photometric mode shown in FIG. 12. Thus, in a manner similar to that mentioned above, the program loops around the path, providing a bar display of the exposure period value TV based on the average brightness value BV1, by means of the display 39 (see FIG. 6). It is to be noted that when the changeover button 15 is released, since the average photometric mode selection switch SW1 is formed by a self-resetting switch, it follows that I1 is unequal to 1, but since the content of the spotwise mode detecting flag MA1 is once set to "0", an exit is made through NO from the decision block to see if (MA1)=1, branching to the flow chart for the average photometric mode shown in FIG. 12 through ②—②, in the similar manner as mentioned above.

(2) Under the condition that the average photometric mode is established, the EE lock knob 13 may be turned to bring the pointer thereon into alignment with the index "EE.LOCK", thereby establishing the EE lock during the average photometric mode. This presumes that at least one photographing operation has taken place since the camera has been turned on and the EE lock enable flag ME2 has "1" as its content. Consequently, in the flow chart of FIG. 11, an exit is made through NO from the decision block to see if (ME2)=0, followed by a decision to see if I3=1. If no photographing operation has taken place since the camera has been turned on, the flag ME2 remains to be "0" even if the knob 13 is turned to bring the pointer thereon into alignment with the index "EE.LOCK", and hence the decision block to see if I3=1 is skipped over, thus avoiding the selection of the EE lock mode. When I3=1, the EE lock mode selection switch SW3 is turned on, and hence an exit is made through YES from this decision block. "1" is stored in the EE lock detecting flag ME1. If the knob 13 is subsequently released and the selection switch SW3 is turned off under the influence of the bias applied thereto, the EE lock mode remains maintained. The content (MC1) of the number of entries memory MC1 is transferred to the number of entry memory M6 and the content (MA3) of a mode storing flag MA3 which enables the EE lock is transferred to the spotwise mode detecting flag MA1. It will be understood that these operations have significance only when a previous photographing operation has taken place in the spotwise photometric mode, but has no significance in the present instance where the operation took place in the average photometric mode. If the EE lock is selected during the average photometric mode and a previous photographing operation has taken place in the spotwise photometric mode, the next photographing operation occurs with the EE lock in the spotwise photometric mode, in the same manner as the selection of the EE lock during the spotwise photometric mode, which will be described in detail later.

Figure 7:
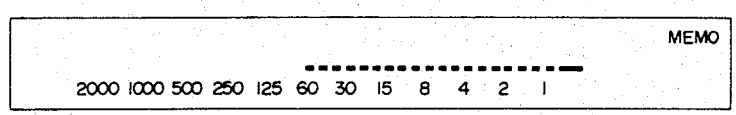

Then follow the decisions to see if I1=1 and I2=2. It will be appreciated that it is normally not imaginable that the EE knob 13, the entry button 14 and the average photometric mode changeover button 15 are operated simultaneously. Thus it may be presumed that the switches SW1 and SW2 are off, and hence an exit is made from these decisions through NO, followed by storing "0" in the entry detecting flag MA2. Subsequently, an exit is made through NO from the decision to see if (MA1)=1, thus branching to the flow chart for the average photometric mode shown in FIG. 12 through ②—②. In this flow chart, the decision to see if (ME1)=1 determines if the EE lock mode is selected. Since this mode is selected now, an exit is made through YES from this decision block, followed by the basic display. As shown in FIG. 7, the basic display includes the display of exposure period indices from "1" to "2000" and the index "MEMO". The content (M10) of a brightness value saves memory M10, that is, the average brightness value BV1 during the previous photographing operation, is restored in the brightness value memory M1 in order to permit the same exposure level to be used as that used during the previous photographing operation. Subsequently, the film speed value SV, correction value CV and diaphragm value AV are entered, the Apex calculation of exposure period value TV (M5) is made and then displayed in the bar form (see FIG. 7), in a manner similar to that used during the normal, average photometric mode mentioned above under the section (1). In other words, in the EE lock mode, the average brightness value BV1 is not updated, but the average brightness value BV1 used immediately before the EE lock mode is selected is employed, while updating only the film speed SV, correction value CV and diaphragm value AV. This means that an exposure level used in any photographing operation is maintained constant. The depression of the shutter release button 11 triggers a shutter release in the normal manner as mentioned above in connection with the average photometric mode under section (1).

(3) Considering the operation during the spotwise photometric mode, it will be noted that this mode is selected by the depression of the entry button 14. Specifically, the depression of the entry button 14 turns the entry switch SW2 on, and in the flow chart of FIG. 11, an exit is made through YES from the decision block to see if I2=1. Then follows a decision to see if (ME1)=1 in order to determine if the EE lock mode is established. Assuming that such mode is not selected, an exit is made through NO from this decision, whereupon a decision is made to see if (MA2)=1 in order to determine whether the depression of the entry button 14 represents the entry of any spotwise brightness value. The purpose of this decision will be understood when one considers that if the entry of spotwise data is detected by seeing if the entry switch SW2 is turned on, the presence of such entry will be determined upon each circulation through the flow chart, which is avoided by confirming that the entry switch SW2 is turned off once after one depression of the entry button and then looking for another entry. Before the spotwise photometric mode is selected, the entry detecting flag MA2 is initialized to "0", and hence initially the program makes its exit through NO from the decision block to see if (MA2)=1. "1" is then stored in the spotwise mode detecting flag MA1 and the entry detecting flag MA2, respectively, thus keeping in storage the selection of the spotwise photometric mode and that the entry of spotwise data must not occur unless the entry button 14 is once released. The program then branches to the flow chart for the spotwise photometric mode shown in FIG. 14 through ④—④.

Figure 8:
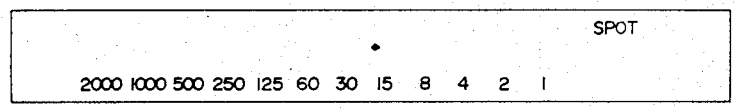

In the flow chart of FIG. 14, the basic display initially occurs. As shown in FIG. 8, the basic display includes the display of exposure period indices from "1" to "2000" and the index "SPOT". The number of entries memory M6 is then incremented by one, as indicated by M6←(M6)++1. As mentioned previously, the memory M6 is initialized to "−1" when the spotwise photometric mode is selected, and hence incrementing it changes its content to "0", whereby an exit is made through YES from a next following decision to see if (M6)=0. As mentioned previously, the purpose of this arrangement is to allow the first depression of the entry button 14 to change the photographing mode to the spotwise photometric mode alone, without accompanying the entry of any brightness value. Subsequently, spotwise brightness value BV2 is entered into spotwise brightness save memory M7, and then the subroutine SUB II follows to enter film speed value SV, correction value CV and diaphragm value AV. The Apex calculation of an exposure period value TV (M8) then takes place, and this value is displayed by the display 39 in the point form to indicate an exposure period for that portion of an object being photographed which is currently being determined. Thus, it will be seen that the camera 10 permits the entry of a spotwise brightness value while allowing a user to monitor an exposure level for a portion of the object which is being determined.

A decision then follows to see if I5=1, thus determining if the shutter release has taken place. If it has not, an exit is made through NO, and an interval instruction is executed, followed by returning to the flow chart of FIG. 11 through ①—①. Normally, the entry switch SW2 is maintained on for a duration greater than a time length (about 0.1 sec) which is required for one cycle of the flow chart. Hence during a second pass through the program, after making an exit through YES from the decision block of I2=1, an exit is made through YES from the decision block of (MA2)=1 this time, thus branching to the flow chart for the spotwise photometric mode shown in FIG. 14 through ⑤—⑤. Hence, spotwise brightness value BV2 is stored in the spotwise brightness value save memory M7 again, and subsequently an exposure period for that portion of the object being photographed which is being currently determined is displayed in the point form.

Subsequently when the entry button 14 is released, the entry switch SW2 is turned off by a bias applied thereto, whereby I2 becomes unequal to 1. Hence, in the flow chart of FIG. 11, an exit is made through NO from the decision of I2=1. However, since "1" is stored in the spotwise mode detecting flag MA1 during the first pass through the program, an exit is made through YES from the decision of (MA1)=1, after initializing the flag MA2 by storing "0" therein. An exit is made through NO from the decision of (ME1)=1, thus branching to the flow chart for the spotwise photometric mode shown in FIG. 14 through ⑤—⑤. The subsequent program portion remains the same as when the entry button 14 is depressed.

Figure 11:
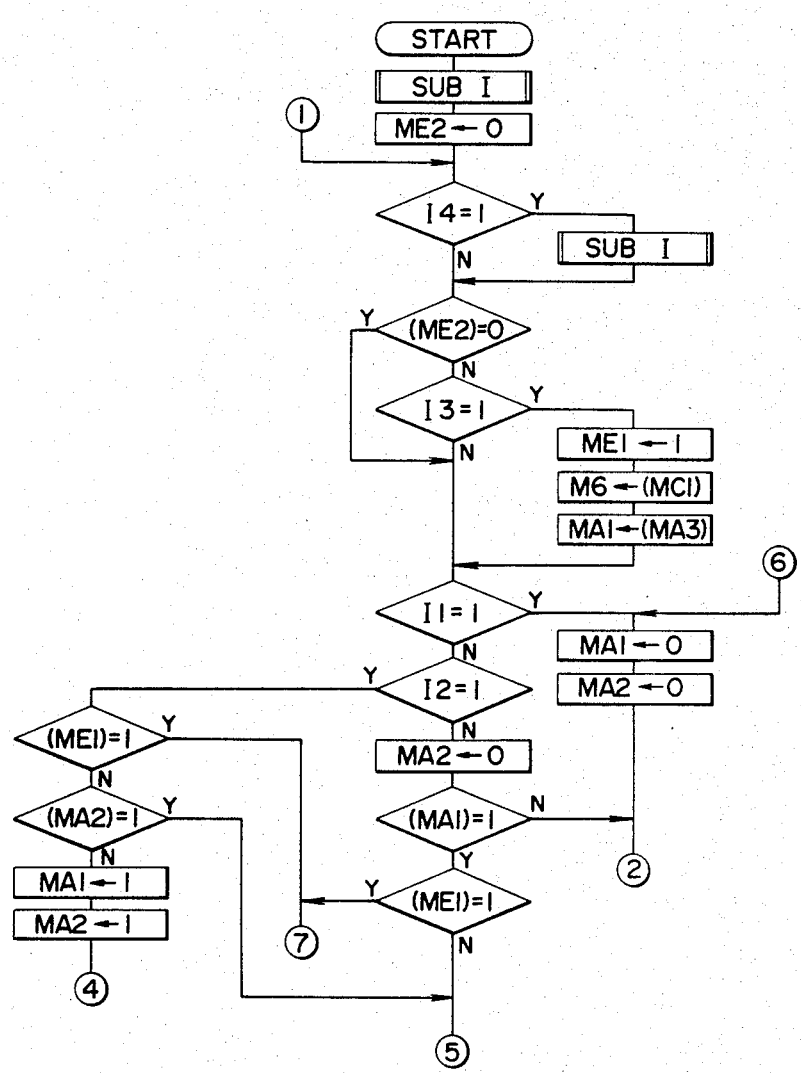
FIGS. 11 to 16 are flow charts illustrating programs used in the microcomputer shown in FIG. 5.

When the entry button 14 is depressed again to close the entry switch SW2, in the flow chart of FIG. 11, an exit is made through YES from the decision of I2=1, and then an exit is made through NO from the decision of (MA2)=1, followed by storing "1" in the spotwise mode detecting flag MA1 and the spotwise entry detecting flag MA2. Subsequently, the program branches to the flow chart for the spotwise photometric mode shown in FIG. 14 through ④—④. In this flow chart, the basic display occurs initially, followed by incrementing the number of entries memory M6 by one, as indicated by M6←(M6)+1, whereby the memory M6 has the content (M6) of "1". Thus, an exit is made through NO from the following decision block to see if (M6)=0, thus storing spotwise brightness value BV2 in the brightness value save area MBn where n represents the content (M6) of the memory M6. Since (M6)=1 now, the brightness value BV2 is saved in a memory at the address MB1. The Subroutine SUB II then follows to enter the film speed value SV, correction value CV and diaphragm value AV. The Apex calculation of an exposure period TV corresponding to the spotwise brightness value BV2 then takes place, and this value is stored in the corresponding exposure period save area MSN. The exposure period value TV is displayed by the display 39 in the point form. An arithmetic means of exposure period values TV is then calculated according to $$\sum_{N=1}^{n} (MSN)/n,$$

and is stored in an exposure period save memory M5. It will be seen that since the single entry has been made, the brightness value BV2 itself represents the mean value. This mean value is then displayed by the display 39 in bar form. Subsequently, the brightness value BV2 is stored in the spotwise brightness value save memory M7. Subsequently, an exposure period value for a portion of the object being photographed which is being currently determined is displayed in bar form, in a similar manner.

A decision then follows to see if I5=1, determining if the shutter release has taken place. If it has not, an exit is made through NO, and an interval instruction is executed to return to the flow chart for the mode determination shown in FIG. 11 through ①—①. During a second and a subsequent pass through the program, an exit is made through YES from the decision of I2=1 and through YES from the decision of (MA2)=1, thereby branching to the flow chart for the spotwise photometric mode shown in FIG. 14 through ⑤—⑤, in a manner similar to that described above in connection with the first depression of the entry button 14. When the entry button 14 is released, an exit is made through NO from the decision of I2=1 while an exit is made through YES from the decision of (MA1)=1, thus branching to the flow chart for the spotwise photometric mode shown in FIG. 14 through ⑤—⑤, in a manner similar to that as mentioned above.

Figure 9:
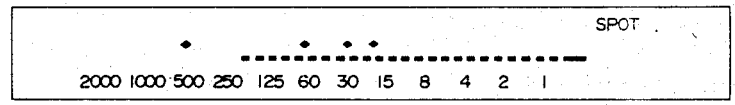

When the entry button 14 is depressed a plurality of times in this manner, it is assured that an exit is made through NO from the decision of (MA2)=1 during the initial pass through the program when I2=1 applies, thus branching to the flow chart for the spotwise photometric mode shown in FIG. 14 through ④—④, thereby incrementing the number of entries memory M6 by one as indicated by M6←(M6)+1. In this manner, the content (M6) or the value of n is incremented sequentially, thus storing successive brightness values BV2 at the memory which has a sequentially incremented address number from MB1 to MBn. It will be seen that for each entry of spotwise brightness value, the Apex calculation of a corresponding exposure period is repeated according to the formula {(MBN)+(M2)+(M3)−(M4), for N=1 to n}, and each exposure period value is stored in a corresponding memory of exposure period save area MSN (N=1 to n). Each of these exposure period values TV is displayed by the display 39 in point form. (FIG. 9 illustrates three entries of spotwise brightness values.) Subsequently, an arithmetic mean of exposure period values TV is calculated according to $$\sum_{N=1}^{n} (MSN)/n,$$

and the result is stored in the exposure period save memory M5. The mean value (M5) is displayed by the display 39 in bar form (see FIG. 9). Subsequently, spotwise brightness value BV2 which is being currently determined is entered, and a corresponding exposure period value TV is displayed in point form. The point display shifts as the camera 10 is moved or a change occurs in the brightness of an object being photographed, and therefore, can be distinguihsed from the point display of the exposure period corresponding to the spotwise brightness values which have already been entered.

If the shutter release button 11 is depressed to close the release switch SW5, in the flow chart for the spotwise photometric mode shown in FIG. 14, an exit is made through YES from the decision of I5=1, thus making a decision to see if (M6)=0. The purpose of making such a decision is to enable a photographing operation in the average photometric mode rather than the spotwise photometric mode if the shutter release button 11 is depressed when the spotwise photometric mode is selected, but when there is no entry of a spotwise brightness value. Specifically, if no entry of a spotwise brightness value has taken place, the number of entries memory M6 has a count of "0", whereby an exit is made through YES from the decision of (M6)=0, thus causing the program to return once to the flow chart of FIG. 11 through ⑥—⑥. Then, the spotwise mode detecting flag MA1 and the entry detecting flag MA2 are initialized to "0", and thereafter the program enters the flow chart for the average photometric mode shown in FIG. 12 through ②—②, thus allowing the shutter release to take place in quite the same manner as in the average photometric mode. It is to be noted that although an exposure period value TV according to the average photometry is calculated after the depression of the shutter release button 11, and then the flow chart for the shutter release shown in FIG. 13 is re-entered to initiate an exposure process, such processing operation is completed within a time interval of several milliseconds, and hence there is no influence whatsoever on the actual photographing operation.

On the other hand, if the shutter release button 11 is depressed when the spotwise photometric mode is selected and when there is entry of a spotwise photometric value or values, in the flow chart of FIG. 14, an exit is made through YES from the decision of I5=1, and an exit is made through NO from the decision of (M6)=0, whereby the program directly enters the flow chart for the shutter release shown in FIG. 13. Then, the shutter release operation which remains the same as that occurring in the average photometric mode mentioned in the above section (1) takes place. However, in the present photographing operation, the exposure process is controlled in accordance with a mean value stored in the save memory M5 which represents the average of individual spotwise brightness values. Also, since the photographing operation is in the spotwise photometric mode this time, the program portion relating to the retention or saving of spotwise brightness values (MPN←(MBN), N=1 to n), of spotwise mode detecting flag MA1←(MA3←(MA1)) and of the number of entries (MC1←(M6)) has significance. Thus, these values used during the present photographing operation are saved since it is possible that the next photographing operation may take place in the spotwise photometric mode with the EE lock. After the termination of the exposure process, "0" is stored in the entry detecting flag MA2, thus initializing it to the same condition as when the entry button 14 is once released, even though the shutter release takes place while maintaining the entry button 14 depressed. The decision of (MA1)=1 determines that the present photographing operation has taken place in the spotwise photometric mode.

Spotwise brightness values which have been entered are cancelled by storing "0" in the number of entries memory M6. The purpose of this is to enable the entry of a spotwise brightness value immediately rather than changing the photographing mode if the entry button 14 is depressed next, inasmuch as the present photographing operation has taken place in the spotwise photometric mode. Resetting the content of the number of entries memory M6 to "0" causes spotwise brightness values which have been entered to be cancelled without clearing the content of brightness value save area MBN since the spotwise brightness values which have been entered are maintained by the content (M6) of the memory M6, or n.

(4) The EE lock in the spotwise photometric mode is established by turning the knob 13 to bring the pointer thereon into alignment with the index "EE.LOCK" when the spotwise photometric mode is selected. This presumes that at least one photographing operation has taken place or the content (ME2) of the EE lock enable flag ME2 is equal to "1". Thus referring to the flow chart of FIG. 11, an exit is made through NO from the decision of (ME2)=0, and an exit is made through YES from the decision of I3=1. In a similar manner to that used when selecting the EE lock during the average photometric mode, mentioned above under the section (2), "1" is stored in the EE lock detecting flag ME1, and the content (MC1) of the number of entries memory MC1 is transferred to the number of entries memory M6 while the content (MA3) of the mode storing flag MA3 is transferred to the spotwise mode detecting flag MA1, thus restoring the number of entries made during the previous photographing operation and restoring the spotwise photometric mode.

Figure 10:
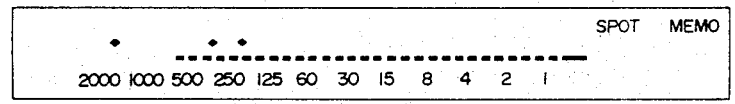

In the following program portion, an exit is made through NO from the decision of I1=1, followed by the decision of I2=1. Regardless of an exit being made through YES or NO from this decision, an exit is eventually made through YES from the decision of (ME1)=1, thus branching to the flow chart for the spotwise photometric mode shown in FIG. 14 through ⑦—⑦. Then the basic display takes place initially. As shown in FIG. 10, the basic display includes the display of exposure period indices from "1" to "500", the index "SPOT" and the index "MEMO". The subroutine SUB II then follows to enter the film speed value SV, correction value CV and diaphragm value AV. The calculation of an exposure period corresponding to each of spotwise brightness values which are already entered and saved is made according to the formula {(MPN)+(M2)+(M3)−(M4), for N=1 to n}, with the result being stored in a corresponding memory of the save area MSN (N=1 to n). Each exposure period value TV is displayed by the display 39 in the point form. (FIG. 10 illustrates a case when two brightness values have been previously entered and saved.) Subsequently, a mean value of exposure period values TV is determined in a similar manner to that used during the normal spotwise photometric mode, mentioned above under the section (3), and is displayed in the bar form. A brightness value which is being currently determined is entered, and the corresponding exposure period is displayed in the point form (see FIG. 10). When the shutter release button 11 is depressed, an exit is made through YES from the decision of I5=1 as during the normal spotwise photometric mode mentioned above under the section (3), thus branching to the flow chart for the shutter release of FIG. 13 through ③—③, thus initiating the control of an exposure process. Spotwise brightness values which have been entered are saved again at this time, thus permitting the performance of as many photographing operations as desired under the same exposure condition.

When the EE lock knob 13 is turned to bring the pointer thereon into alignment with the index "CLEAR", the clear switch SW4 is turned on, whereby in the flow chart of FIG. 11, an exit is made through YES from the decision of I4=1, whereby the subroutine SUB I initializes various flags and memories. This terminates the spotwise photometric mode and the EE lock mode, whereby the camera 10 automatically returns to the normal average photometric mode.

What is claimed is:

1. A camera including average photometric means which effects average photometry of an object and spotwise photometric means which effects a spotwise photometry of part of an object being photographed, the camera being capable of selecting the spotwise photometric means for operation when in a spotwise photometric mode in which an exposure level is determined on the basis of a result of an arithmetic operation performed on spotwise brightness values entered; comprising:

storing means;
   an entry member for commanding the entry of a spotwise brightness value;
   means responsive to operation of the entry member for entering a spotwise brightness value in the storing means;
   means for averaging the stored spotwise values;
   means for transferring the average spotwise value to the storing means;
   a shutter assembly;
   means for nullifying spotwise brightness values and the result of the arithmetic operation in response to the completion of operation of the shutter assembly which indicates completion of a photographing operation; and
   means for maintaining a selected photographing mode independently of the completion of a photographing operation.

2. The camera of claim 1 wherein the memory means includes a plurality of storing locations for inputting a plurality of spotwise input values to permit calculation of an average spotwise value based on the plurality of stored spotwise input values.

3. The camera of claim 2 in which the plurality of stored locations stores a plurality of inputs in the order of their insertion;
   means responsive to completion of a photographing operation for resetting said memory locations.

4. A camera including average photometric means which effects average photometry of an object being photographed and spotwise photometric means which effects a spotwise photometry of part of an object being photographed, the camera being capable of selecting a spotwise photometric mode in which an exposure level is determined on the basis of a result of an arithmetic operation performed on spotwise brightness values which are each entered at various intervals selected by the operator; characterized by
   storing means;
   an entry member for commanding the entry of spotwise brightness values, mode selection means responsive to operation of the entry member for selecting a spotwise photometric electronic mode; and transfer means responsive to only predetermined operations of the entry member for entering a spotwise brightness value in said storing means.

5. A camera according to claim 4 in which the spotwise photometric mode is selected by said electronic mode selection means in response to a first operation of the entry member, and in which the entry of a spotwise brightness value or values under control of said transfer means takes place in response to a second and subsequent operations of the entry member.

6. A camera comprising:

automatic exposure control means for automatically controlling an exposure in accordance with the brightness of an object being photographed;

exposure mode selecting means;

memory means for storing at least one exposure factor to be used during the control of an exposure by the automatic exposure control means responsive to operation of the exposure mode selecting means;

an operating member for commanding the automatic exposure control means to control the exposure at the same exposure level as used during a previous photographing operation, by utilizing the exposure factor previously stored in the memory means;

means for retaining the previously stored factor in said memory and means responsive to operation of the operating members for utilizing the retained factor in the next photographing operation.

7. An exposure control method for a camera having average photometric means which effects average photometry of an object and spotwise photometric means which effects spotwise photometry of part of an object being photographed, storing means, entry means for commanding the entry of a spotwise brightness value, said method comprising the steps of;

selecting the spotwise photometric mode to energize the photometric means;

storing a spotwise photometric value in the storing means upon operation of the spotwise entry member;

storing photographing information related to the photographing operation in the storing means;

calculating an exposure control value as a function of the spotwise photometric value and the photographing information in the storing means;

initiating an exposure control operation and maintaining the spotwise photometric mode during a shutter release operation;

automatically nullifying the stored spotwise photometric value upon completion of the shutter release operation.

8. An exposure control method for a camera having average photometric means which effects average photometry of an object and spotwise photometric means which effects spotwise photometry of part of an object being photographed, storing means, entry means for commanding the entry of a spotwise brightness value, and an automatic exposure lock commanding member for retaining a stored exposure value in the storing means, said method comprising the steps of;

selecting the spotwise photometric mode to energize the photometric means;

storing a spotwise photometric value in the storing means upon operation of the spotwise entry member;

storing photographing information related to the photographing operation in the storing means;

calculating an exposure control value as a function of the spotwise photometric value and the photographing information in the storing means;

initiating a first exposure control operation and maintaining the spotwise photometric mode during a shutter release operation;

storing an exposure value utilized during the first exposure control operation during the first exposure control;

detecting the condition of the automatic exposure lock commanding member;

conducting a second exposure control utilizing the exposure value previously stored when said automatic exposure lock commanding member is activated; and releasing the camera shutter upon detection of activation of the commanding member.

9. A camera including:

average photometric means for effecting average photometry of an object;

spotwise photometric means for effecting spotwise photometry of part of an object to be photographed;

means for selecting the photometric mode for a photographing operation adapted to selectively energize one of the aforesaid photometric means;

storing means;

an entry member for commanding the entry of spotwise brightness values;

means responsive to operation of the entry member for entering a spotwise brightness value in said storing means;

means for determining the average value of the spotwise brightness values stored in said storing means;

display means for displaying the average spotwise brightness value and each spotwise brightness value stored in said storing means;

means responsive to selection of the average photometry mode causing the display means to display a value which is a function of the average photometry brightness value.

* * * * *

UNITED STATES PATENT AND TRADEMARK OFFICE
CERTIFICATE OF CORRECTION

PATENT NO. : 4,529,289

DATED : July 16, 1985

INVENTOR(S) : Tsunefuji et al

It is certified that error appears in the above-identified patent and that said Letters Patent is hereby corrected as shown below:

Column 12, line 19 after "each" insert --of--.

Column 17, line 57 change "++1" to --+1--.

Column 19, line 34 delete "as".

Column 22, line 67 after "values," insert --electronic--.

Column 23, line 1 delete "electronic".

Column 23, line 29 change "members" to --member--.

Signed and Sealed this

Fifteenth Day of October 1985

[SEAL]

Attest:

Attesting Officer

DONALD J. QUIGG

Commissioner of Patents and Trademarks—Designate